United States Patent
Braun

(10) Patent No.: US 9,816,579 B2
(45) Date of Patent: Nov. 14, 2017

(54) STAGED SOFTENING GAS SHOCK

(71) Applicant: J. D. Braun, Santa Ana, CA (US)

(72) Inventor: J. D. Braun, Santa Ana, CA (US)

(\*) Notice: Subject to any disclaimer, the term of this patent is extended or adjusted under 35 U.S.C. 154(b) by 50 days.

(21) Appl. No.: 14/994,579

(22) Filed: Jan. 13, 2016

(65) Prior Publication Data
US 2017/0198781 A1    Jul. 13, 2017

(51) Int. Cl.
B60G 13/00    (2006.01)
F16F 13/00    (2006.01)
B62K 25/06    (2006.01)

(52) U.S. Cl.
CPC .......... F16F 13/007 (2013.01); B62K 25/06 (2013.01)

(58) Field of Classification Search
CPC ........ F16F 13/007; F16F 9/468; B60G 15/12; B60G 17/08; B62K 25/283; B62K 25/06
USPC ........ 267/221, 64.11, 64.13, 64.16; 188/285, 188/314, 318, 322.22
See application file for complete search history.

(56) References Cited

U.S. PATENT DOCUMENTS

| | | | | |
|---|---|---|---|---|
| 4,746,106 A * | 5/1988 | Fukumura | ............... | F16F 9/468 267/218 |
| 5,123,506 A * | 6/1992 | Sirven | ................... | B60G 17/08 137/501 |
| 5,222,873 A * | 6/1993 | Whitehead | ........... | F01L 25/066 137/596.18 |
| 7,559,396 B2 * | 7/2009 | Schwindt | ............. | B62K 25/283 180/227 |
| 7,677,347 B2 * | 3/2010 | Brawn | ................... | B60G 17/06 180/227 |
| 8,386,127 B2 * | 2/2013 | Song | ...................... | B62K 21/08 180/227 |
| 2011/0101579 A1 * | 5/2011 | Polakowski | ........... | B60G 15/12 267/64.26 |

\* cited by examiner

*Primary Examiner* — Pamela Rodriguez
(74) *Attorney, Agent, or Firm* — Clement Cheng

(57) ABSTRACT

An adjustable gas shock has a staged softening which includes a gas piston assembly having an gas piston. A piston hollow is formed on the frame and the gas piston is glidingly installed in the piston hollow defining an upper air chamber above the piston and a lower air chamber below the piston. The air piston moves in response to vibrations. A piston shaft hollow is formed on a piston shaft formed on the air piston. The piston shaft hollow has a piston shaft plug glidingly in the piston shaft hollow. The piston shaft plug is spring biased to push air out of the piston shaft hollow. A side opening hollow is formed on the frame. The side opening hollow has a side opening plug glidingly installed in the side opening hollow.

12 Claims, 3 Drawing Sheets

STAGED SOFTENING GAS SHOCK

FIELD OF THE INVENTION

The present invention is in the field of gas shocks for vehicle suspensions.

DISCUSSION OF RELATED ART

A variety of different adjustable gas shocks have been implemented to provide a soft ride for motorcycles, cars and trucks. J. D. Braun in U.S. Pat. No. 7,677,347 issued Mar. 16, 2010 provides for an adjustable gas shock, the disclosure of which is incorporated herein by reference. A variety of different adjustable gas shocks can be improved.

SUMMARY OF THE INVENTION

An adjustable gas shock has a staged softening which includes a gas piston assembly having an gas piston. A piston hollow is formed on the frame and the gas piston is glidingly installed in the piston hollow defining an upper air chamber above the piston and a lower air chamber below the piston. The air piston moves in response to vibrations. A piston shaft hollow is formed on a piston shaft formed on the air piston. The piston shaft hollow has a piston shaft plug glidingly in the piston shaft hollow. The piston shaft plug is spring biased to push air out of the piston shaft hollow. A side opening hollow is formed on the frame. The side opening hollow has a side opening plug glidingly installed in the side opening hollow.

The side opening hollow has a side air passage that communicates between the piston hollow and the side opening hollow. The side opening plug is spring biased to push air out of the side opening hollow. A first stage softening system either includes the piston shaft hollow and piston shaft plug, or the side opening hollow and the side opening plug. A second stage softening system either includes the piston shaft hollow and piston shaft plug if the first stage softening system comprises the side opening hollow and the side opening plug; or the side opening hollow and the side opening plug if the first stage softening system comprises the piston shaft hollow and piston shaft plug.

The side opening plug is spring biased by a side opening plug spring formed as a coil spring. The piston shaft plug is spring biased by a piston shaft plug spring formed as a coil spring. The air piston spring is biased by a coil spring. The side opening hollow is parallel to the piston shaft hollow, and the piston shaft hollow is parallel to the piston hollow. The side opening plug has a side opening plug motion that is parallel to the motion of the piston shaft plug. The first stage is formed on the piston shaft hollow, and the piston shaft plug has a side air passage.

Figure 1:
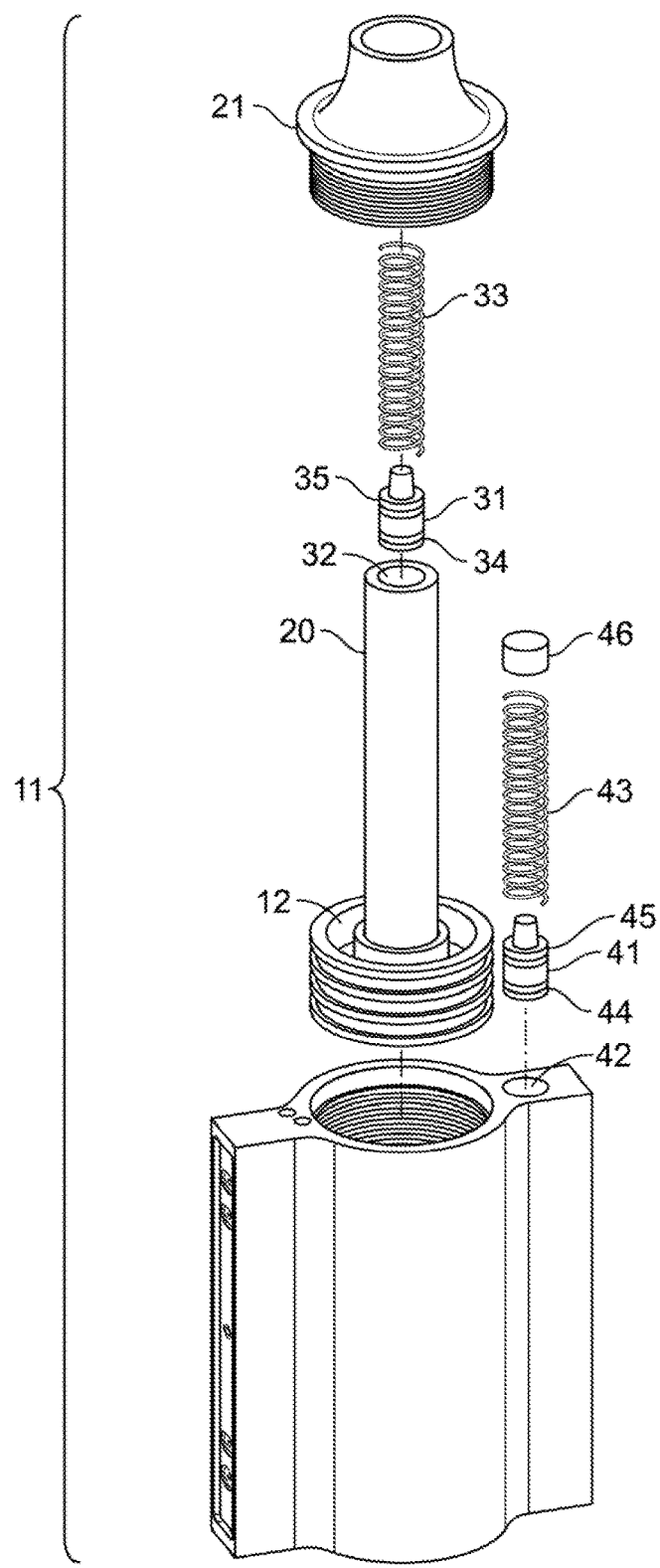
FIG. 1 is a perspective exploded view of the present invention.

The following call out list of elements can be a useful guide in referencing the element numbers of the drawings.
11 air suspension assembly
12 piston spring groove
13 piston seal grooves
14 piston hollow
15 piston spring
20 piston shaft
21 primary piston shaft cover
31 piston shaft plug
32 piston shaft opening
33 piston shaft spring
34 first piston shaft plug seal
35 second piston shaft plug seal
36 piston shaft spring retainer
37 piston shaft hollow
38 piston shaft hollow air passage
41 side opening plug
42 side opening
43 side opening spring
44 first side opening plug seal
45 second side opening plug seal
46 side opening spring retainer
47 side opening hollow
48 side air passage
51 lower chamber air passage
52 lower chamber air passage port
53 upper chamber air passage
54 upper chamber air passage port

DETAILED DESCRIPTION OF THE PREFERRED EMBODIMENT

An air suspension assembly 11 can be made as an adjustable nonlinear gas shock. The gas shock generally has a piston shaft 20 that separates an upper chamber from a lower chamber. The upper chamber has an upper chamber air passage 53 that is accessed by the upper chamber air passage port 54. The lower chamber has a lower chamber air passage 51 that is accessed by the lower chamber air passage port 52. The upper chamber air passage port 54 can be connected to an air hose that is pressurized, and the lower chamber air passage port 52 can also be connected to an air hose that is pressurized. The upper air chamber and the lower air chamber are both pressurized with an upper air chamber air pressure and a lower air chamber air pressure. The upper air chamber air pressure acts against the lower air chamber air pressure from a piston separating the two areas. The piston shaft 20 is retained by a primary piston shaft cover 21. In the context of this invention, air and gas are used interchangeably as both are acceptable operating fluids.

The piston is preferably sealed against the piston hollow 14 at piston seals formed as O-rings that are installed at the piston seal grooves 13. The piston spring 15 can bias the piston in a particular direction. The piston spring 15 can be lodged within a piston spring groove 12. Thus, the piston provides an adjustable air shock that can be adjusted by adding or removing air through the air passages. To raise a motorcycle for example, the user could add more air to the lower chamber through the lower chamber air passage 51.

Figure 2:
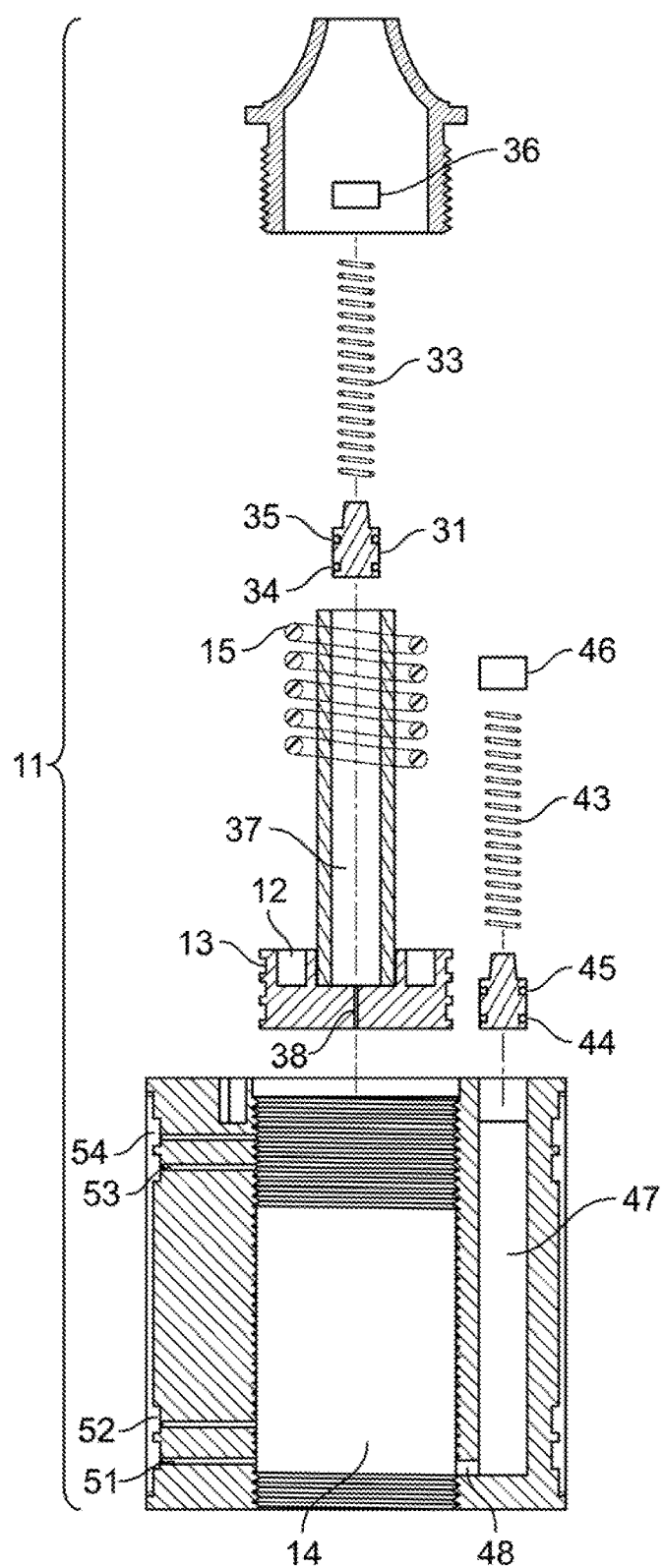
FIG. 2 is a cross-section exploded view of the present invention.
Figure 3:
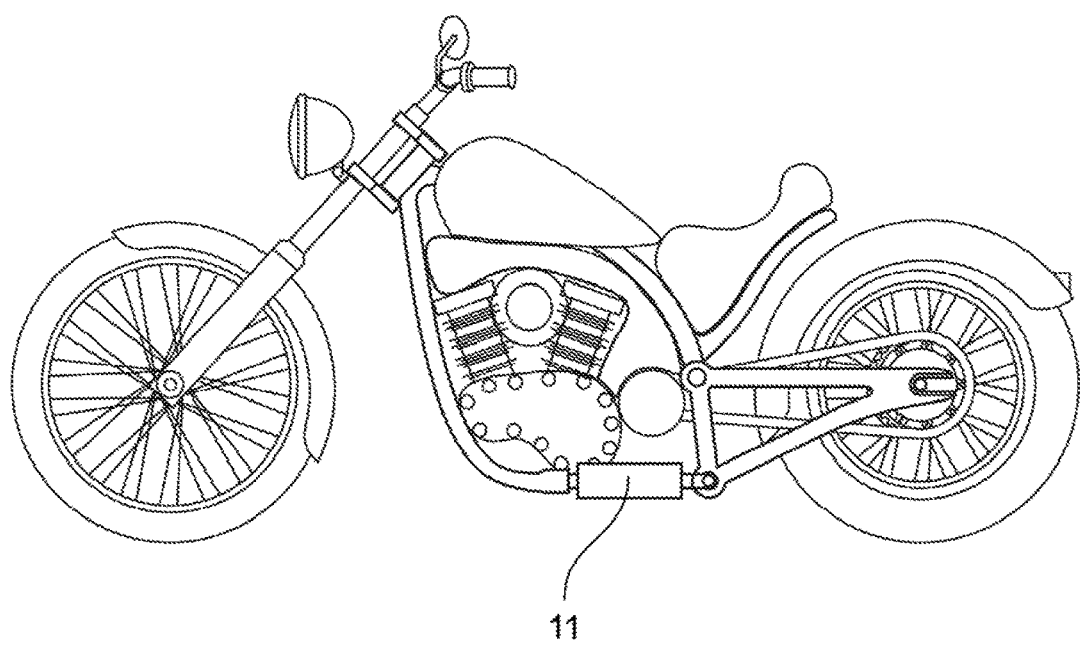
FIG. 3 is an environmental view of the present invention installed on a motorcycle.

A first softening mechanism is provided by the piston shaft hollow 37. When hitting a hard bump, a user may prefer to have an extra range of linear motion that is cushioned for comfort. The piston shaft 20 is preferably hollow and tubular. The piston shaft 20 is connected to the piston and has a piston shaft hollow 37 formed inside of the piston shaft 20. The piston shaft hollow 37 is preferably cylindrical and receives a piston shaft plug 31. The piston shaft plug 31 reciprocates up and down in the piston shaft. The up-and-down direction can be seen in FIGS. 1 and 2 and is indicative of the direction shown in the drawings, which may or may not be the orientation when field installed on a motorcycle. The piston shaft plug 31 moves up and down to allow air into and out of the piston shaft hollow 37. The piston shaft hollow 37 is defined by a circular shaped piston shaft opening 32. The piston shaft plug 31 is biased by a piston shaft spring 33.

The piston shaft plug 31 can have a first piston shaft plug seal 34 and a second piston shaft plug seal 35. The piston shaft plug 31 slides into the piston shaft opening 32 and has a generally airtight seal against the piston shaft hollow 37. The piston shaft hollow has a piston shaft hollow upper portion and a piston shaft hollow lower portion. The piston shaft spring 33 can fit over a protrusion formed on the piston shaft plug 31 and the piston shaft spring 33 can be retained inside the piston shaft hollow 37 by a piston shaft spring retainer 36 that can be formed as a cap.

When a motorcycle rider strikes a bump and the piston is close to it bottom most position, the piston shaft hollow air passage 38 can receive high-pressure air. The piston shaft hollow air passage 38 transmits high-pressure air from the lower chamber to the piston shaft hollow 37 to provide a first nonlinear softening. The piston shaft hollow air passage 38 can be restricted for limiting airflow rates between the lower chamber and the piston shaft hollow 37. When the air arrives in the piston shaft hollow 37, it pushes up the piston shaft plug 31 against the piston shaft spring 33.

A second softening mechanism is provided by a side opening hollow 47. A side opening plug 41 is mounted in a sliding configuration within the side opening hollow 47. A side air passage 48 receives air from the lower chamber of the piston hollow 14 and allows it to bleed into the side opening hollow 47. The side air passage 48 can be restricted by selecting different cross-section areas for different restrictions of air, gas or fluid flow rate. The side air passage 48 can have a circular cross-section of varying diameter.

The side opening plug 41 can be inserted at the side opening 42. The side opening plug 41 preferably has a first side opening plug seal 44 and a second side opening plug seal 45 that can be formed as O-rings or other types of elastomeric seals that can be mounted to the external sidewall of the side opening plug 41. The side opening plug 41 can have a protrusion to receive a hollow portion of a helical spring formed as a side opening spring 43. The side opening spring 43 can be retained within the cylindrical side opening hollow 47 when the side opening spring retainer 46 engages the side opening 42. The side opening spring 43 preferably has different spring qualities such as a different length, coil pitch, diameter, and spring constant than the piston shaft spring 33 and the piston spring 15.

The side opening spring 43, the piston shaft spring 33 and the piston spring 15 preferably operate at under different spring parameters to provide a staged response. In a first stage, the lower chamber and upper chamber mediate the ride during ordinary operation. In a second stage, a second stage overflow hollow is either the piston shaft hollow 37 or the side opening hollow 47. The second stage overflow hollow begins to receive air after the first stage is highly pressurized. Similarly, a third stage overflow hollow can be the piston shaft hollow 37 if the side opening hollow 47 was used for the second stage, or can be the side opening hollow 47 if the piston shaft hollow 37 was used as the second stage. The third stage overflow hollow begins to receive air after the second stage is highly pressurized or as the second stage becomes highly pressurized.

By configuring and adjusting the first stage, the second stage and the third stage, such as by selecting springs, and by adjusting the position of the side opening spring retainer 46 and the piston shaft spring retainer 36, a user can have an even more customizable linear gas shock response, or a nonlinear gas shock response. The first and second stages can occur at least partially simultaneously, and are preferably staggered to provide a customizable response.

The air suspension 11 assembly is installed on a motorcycle. The motorcycle can have an air pump for adding and removing air from a lower chamber air passage port or from an upper chamber air passage port. The air pump can add air from tubes. The air suspension assembly 11 has a generally block structure frame that can be made of an aluminum billet that provides a frame for the air piston assembly. The passages and hollows can be cut from the block of aluminum billet. The side opening 42 is formed in the block structure frame. The piston shaft hollow is formed on the piston shaft and can also be milled from an aluminum billet.

The invention claimed is:

1. An adjustable gas shock having staged softening comprising:
   a. a gas piston assembly having an gas piston, wherein a piston hollow is formed on a frame wherein the gas piston is glidingly installed in the piston hollow defining an upper air chamber above the piston and a lower air chamber below the piston, wherein an air piston moves in response to vibrations;
   b. a piston shaft hollow formed on a piston shaft formed on the air piston, wherein the piston shaft hollow has a piston shaft plug installed glidingly in the piston shaft hollow, wherein the piston shaft plug is spring biased to push air out of the piston shaft hollow, wherein the piston shaft hollow has a piston shaft hollow air passage that transmits high-pressure air from the lower chamber to the piston shaft hollow to provide a first nonlinear softening, wherein the piston shaft hollow air passage is restricted for limiting airflow rates between the lower chamber and the piston shaft hollow;
   c. a side opening hollow formed on the frame, wherein the side opening hollow has a side opening plug glidingly installed in the side opening hollow, wherein the side opening hollow has a side air passage that communicates between the piston hollow and the side opening hollow, wherein the side opening plug is spring biased to push air out of the side opening hollow;
   d. a first stage softening system, wherein the first stage softening system either comprises:
      i. the piston shaft hollow and piston shaft plug, or
      ii. the side opening hollow and the side opening plug; and
   e. a second stage softening system, wherein the second stage softening system either comprises:
      i. the piston shaft hollow and piston shaft plug if the first stage softening system comprises the side opening hollow and the side opening plug; or
      ii. the side opening hollow and the side opening plug if the first stage softening system comprises the piston shaft hollow and piston shaft plug.

2. The adjustable gas shock of claim 1, wherein the side opening plug is spring biased by a side opening plug spring formed as a coil spring.

3. The adjustable gas shock of claim 1, wherein the piston shaft plug is spring biased by a piston shaft plug spring formed as a coil spring.

4. The adjustable gas shock of claim 1, wherein an air piston spring is biased by a coil spring.

5. The adjustable gas shock of claim 1, wherein the side opening hollow is parallel to the piston shaft hollow, and wherein the piston shaft hollow is parallel to the piston hollow.

6. The adjustable gas shock of claim 1, wherein the side opening plug has a side opening plug motion that is parallel to the motion of the piston shaft plug.

7. The adjustable gas shock of claim 1, wherein the first stage is formed on the piston shaft hollow, wherein the piston shaft plug has a side air passage.

8. The adjustable gas shock of claim 7, wherein the side opening plug is spring biased by a side opening plug spring formed as a coil spring.

9. The adjustable gas shock of claim 7, wherein the piston shaft plug is spring biased by a piston shaft plug spring formed as a coil spring.

10. The adjustable gas shock of claim 7, wherein a air piston spring is biased by a coil spring.

11. The adjustable gas shock of claim 7, wherein the side opening hollow is parallel to the piston shaft hollow, and wherein the piston shaft hollow is parallel to the piston hollow.

12. The adjustable gas shock of claim 7, wherein the side opening plug has a side opening plug motion that is parallel to the motion of the piston shaft plug.

\* \* \* \* \*